Sept. 7, 1965         W. L. PERRY         3,204,884
                AUTOMATIC WINDING MACHINE
Original Filed Sept. 29, 1961         14 Sheets-Sheet 1

Sept. 7, 1965   W. L. PERRY   3,204,884
AUTOMATIC WINDING MACHINE
Original Filed Sept. 29, 1961   14 Sheets-Sheet 3

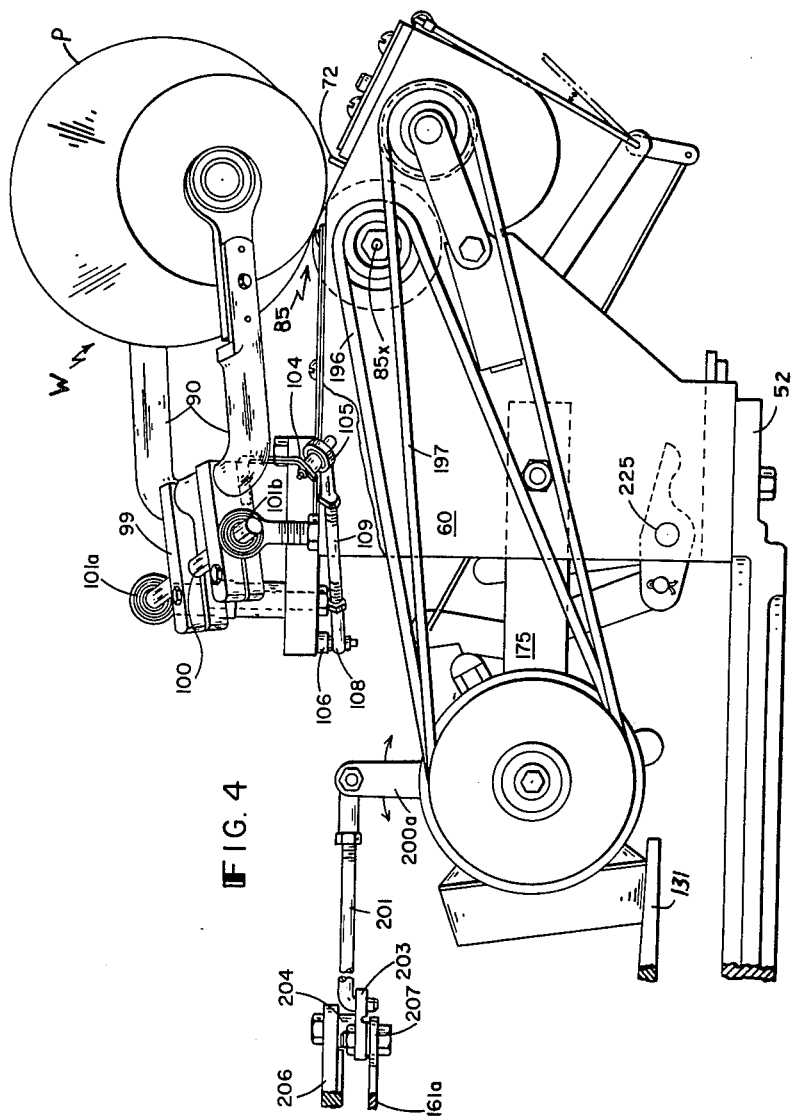

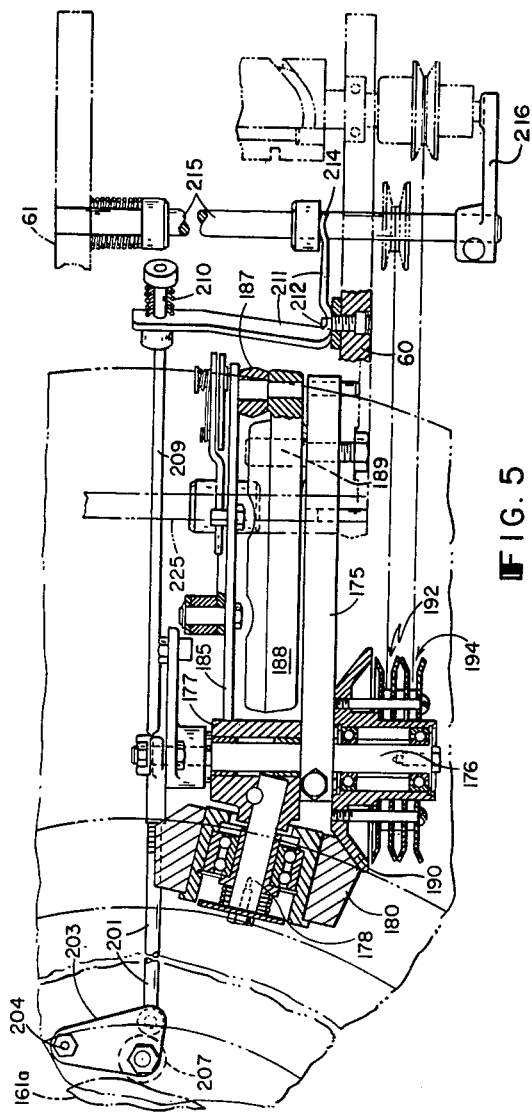

Sept. 7, 1965 W. L. PERRY 3,204,884
AUTOMATIC WINDING MACHINE
Original Filed Sept. 29, 1961 14 Sheets-Sheet 7

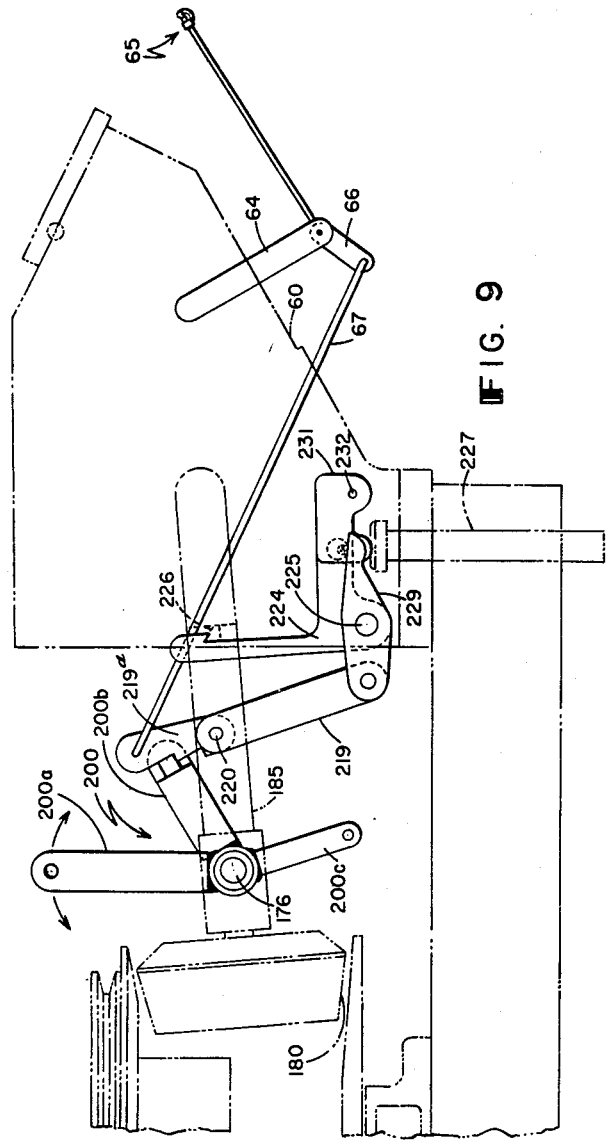

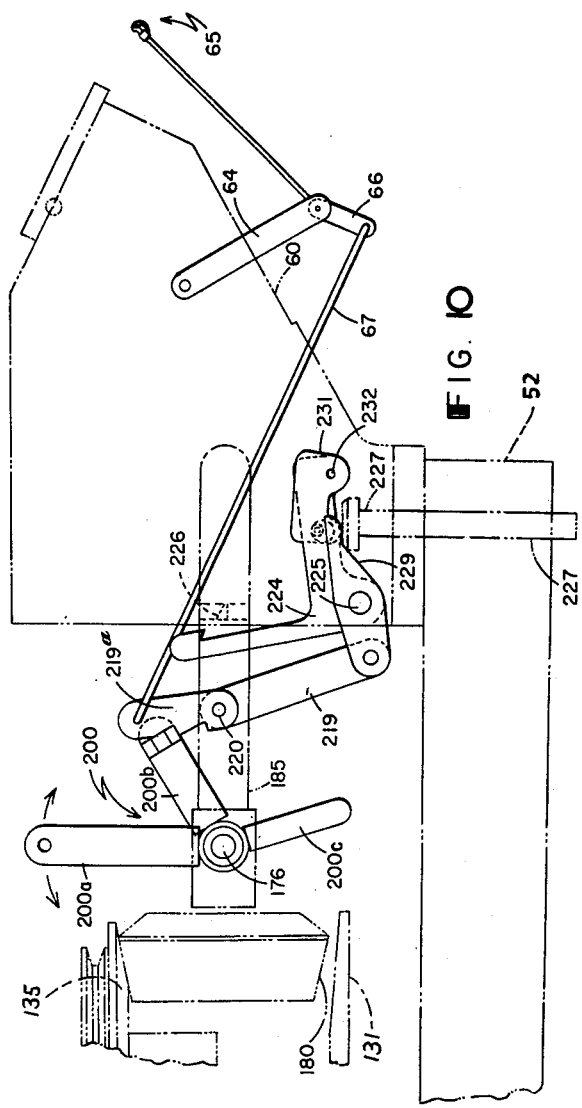

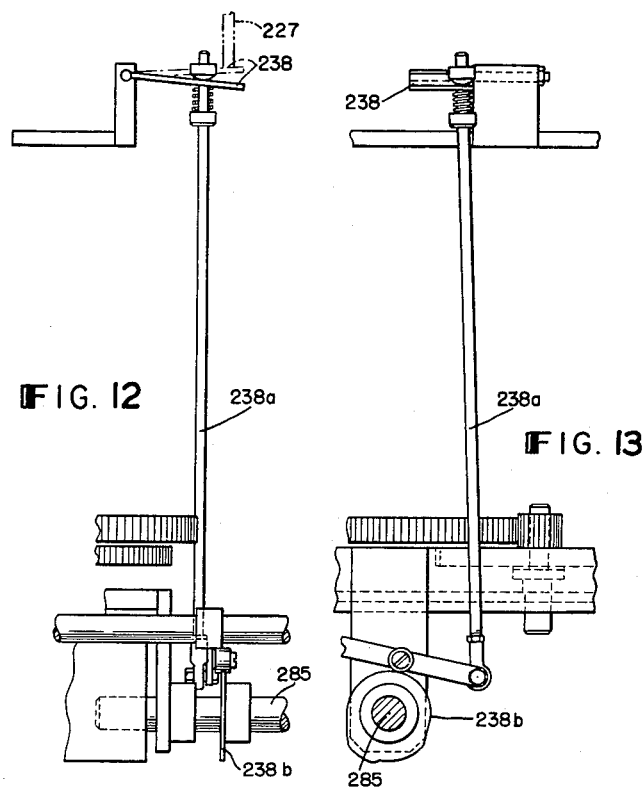

Sept. 7, 1965     W. L. PERRY     3,204,884
AUTOMATIC WINDING MACHINE
Original Filed Sept. 29, 1961     14 Sheets-Sheet 11

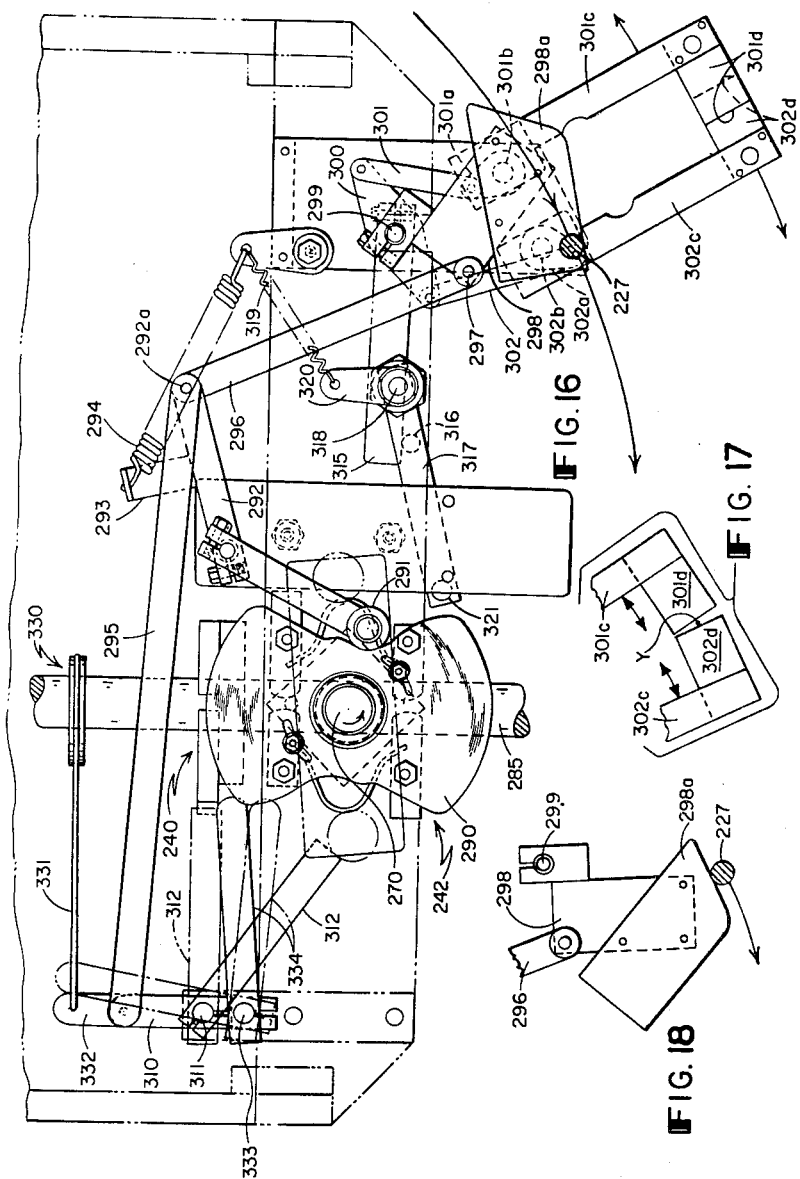

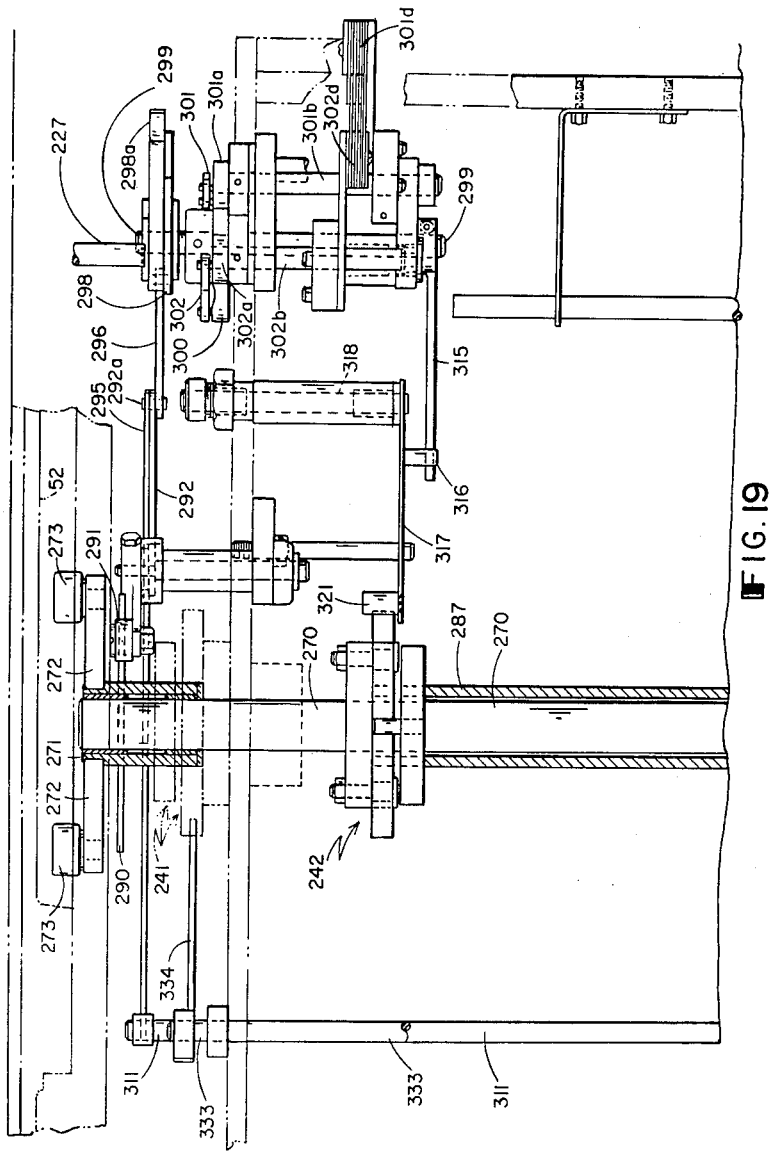

United States Patent Office 3,204,884
Patented Sept. 7, 1965

3,204,884
AUTOMATIC WINDING MACHINE
Winthrop L. Perry, Milford, N.H., assignor to Abbott Machine Co., Inc., Wilton, N.H., a corporation of New Hampshire
Original application Sept. 29, 1961, Ser. No. 141,884. Divided and this application May 28, 1964, Ser. No. 371,066
3 Claims. (Cl. 242—35.5)

This application is a division of my application Serial No. 141,884, filed September 29, 1961, for Winding Machine.

The present invention relates to an automatic winding machine including a plurality of traveling winding units and winding unit tending mechanism, to and past which the units travel, the tending mechanism including a reverse-drive member for causing a reverse or unwinding rotation of the yarn package undergoing an end finding operation.

The invention is particularly concerned with the provision of improved mechanism for stopping the normal rotation of the yarn package of the winding unit upon yarn failure, and connecting the package with and disconnecting it from the reverse-drive member.

In the accompanying drawings:

FIG. 4 is an elevation showing one of the winding units in more detail.

FIG. 5 is a diagammatic view partly in plan and partly in section, with some parts broken away, showing a winding unit.

FIG. 9 is similar to FIG. 7 but shows the winding unit in an inactive non-winding condition.

FIG. 10 is similar to FIGS. 8 and 9 but shows the winding unit being driven in an unwinding direction.

FIG. 12 is a diagram in the nature of an elevation of mechanisms for controlling winding units to cause them to be driven in the winding direction.

FIG. 13 is a view taken from the right side of FIG. 12.

FIG. 16 is a diagrammatic view in the nature of a plan, with numerous parts removed, showing feeler and clutch control mechanism.

FIG. 17 is a fragmentary view showing a different position of the feeler mechanism of FIG. 16.

FIG. 18 is a fragmentary view showing a still different position of portions of the feeler mechanism of FIG. 16.

FIGS. 19 and 20 are diagrammatic views in the nature of elevations, showing respectively upper and lower portions of feeler and clutch control mechanism of the machine.

Figure 1:
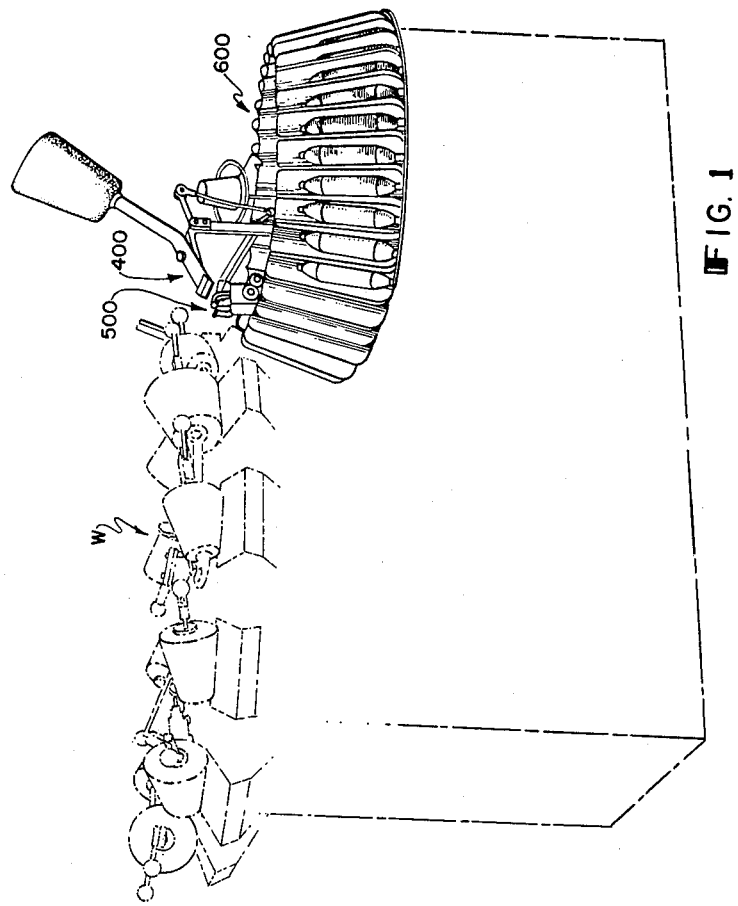
FIG. 1 is a schematic perspective view intended primarily to locate the tending mechanism of the machine with reference to a plurality of winding units which are moved past the tending mechanism.

The winding mechanism, indicated generally at W, includes twelve winding units or heads 51 carried by a table 52 which is driven in intermittent 30° steps by Geneva mechanism subsequently described.

The winding head includes spaced side plate members 60, 61, FIG. 5, connected by various cross connections. Brackets 64 carry a pivotal yarn detector 65, FIGS. 7, 9 and 10, having a crank arm 66 connected by a link 67 to stop mechanism.

Although the winding head may be provided with a grooved package-driving roll that also traverses the winding yarn to distribute it on the winding package, the preferred head shown has separate yarn-traversing and package-driving means.

The winding package is received between the two arms of a generally U-shaped yoke 90, FIG. 4, and rests upon a package-driving roll 85 which is rotated on its axis 85x by a belt drive 196.

Figure 2:
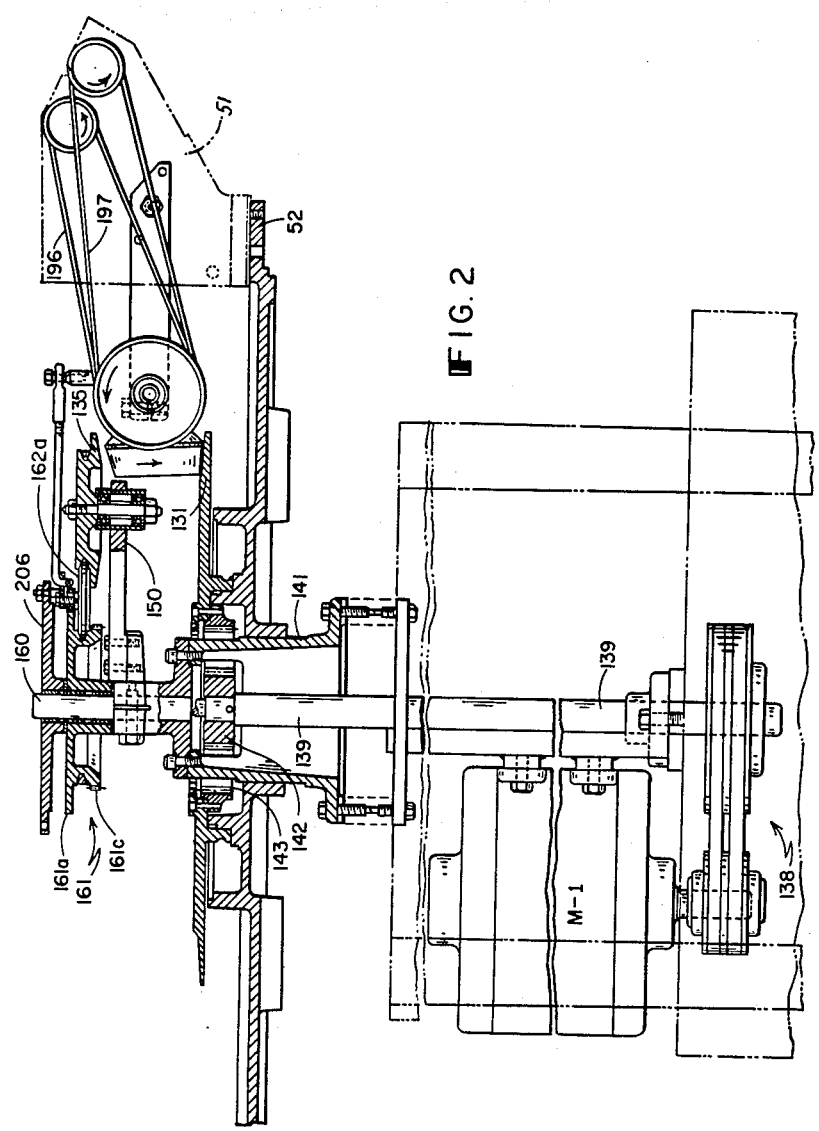
FIG. 2 is a view mainly in vertical section taken through the axis of the rotating table which carries the winding units, also indicating one of the winding units.

The normal winding driving motion for the winding unit is derived from a continuously rotating drive discs 131, common to all of the winding units, and which is coaxial with the table 52 and which has its operative driving surface facing upwardly. A reverse or unwinding driving motion is derived from a smaller reverse drive disc 135 which is positioned to serve a winding unit which is in the position of FIG. 2, whch may be called the twelve o'clock position.

Drive of the discs 131 and 135 is from a motor M-1 through belt and pulley connections 138 to a vertical shaft 139 which is non-concentric with the disc 131, being displaced backwardly away from the observer from the axis of this disc and the axis of a central housing 141. Near its upper end shaft 139 carries a pinion 142 which meshes with an internal gear 143 on the disc 131, the pinion 142 extending out through an opening in the housing 141 to make this engagement with the internal gear.

Figure 3:
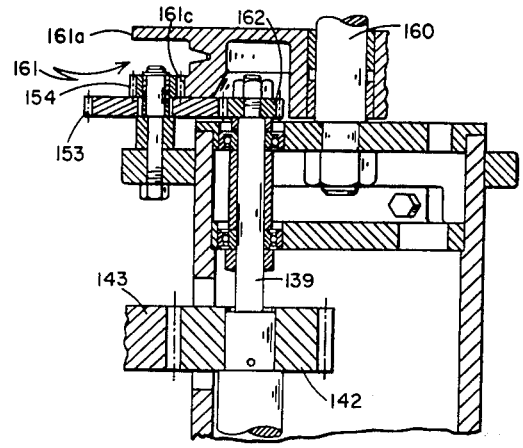
FIG. 3 is a fragmentary vertical section taken through the same vertical axis as is FIG. 2, but looking from left to right in FIG. 2.

The reverse driving disc 135, whose shaft is carried in a bracket 150 mounted on the housing 141 is driven by a system of connections comprising a pinion 162, FIG. 3, at the top of shaft 139, a gear 153 meshing therewith and carrying a pinion 154 which meshes with the gear portion 161c of a combined gear, pulley and cam 161 which turns on a central stub shaft 160. The pulley portion 161b of the combined gear, pulley and cam drives the upper or reverse driving disc 135 through a belt 162a.

Returning now to a winding head, an arm 175 affixed to the frame plate 60 carries a cross shaft 176, FIG. 5, on which is rotatably mounted a sleeve 177 carrying a shaft 178 for a rotatable central pulley 180.

By rotation of the sleeve 177 to different positions about cross shaft 176 conical pulley 180 may either engage the lower driving disc 131, or may engage the upper reverse driving disc 135 (when the winding unit is in the twelve o'clock position where this disc 135 is effective) or may have an intermediate neutral position not engaging disc 135 and yet not sufficiently elevated to meet with disc 135 until further raised.

Figure 6:
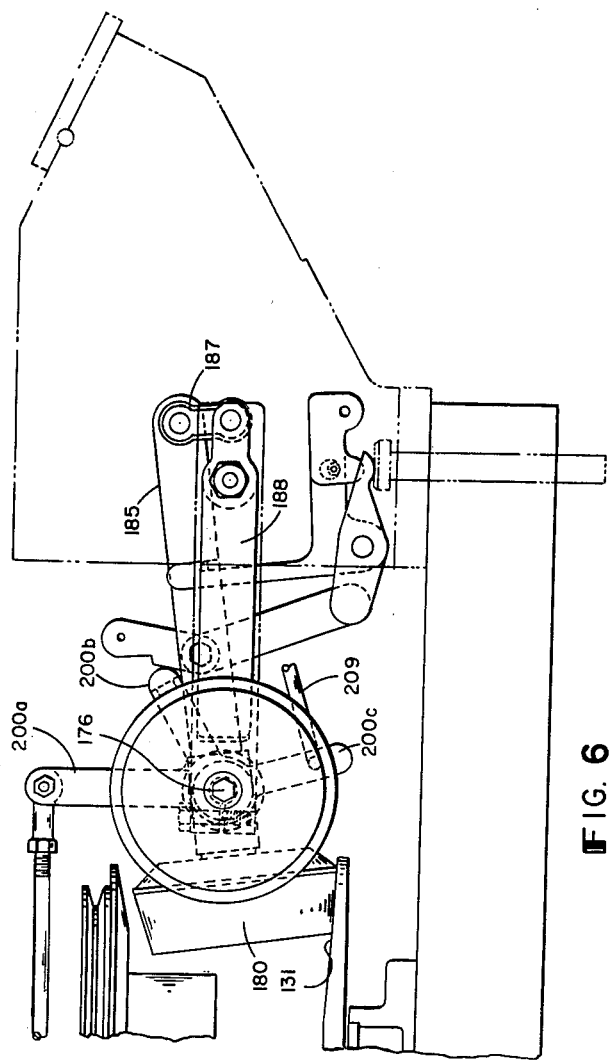
FIG. 6 is a diagram in the nature of an elevation with many parts removed, showing certain linkage within a winding unit.

Sleeve 177 which determines the position of conical pulley 180 has an arm 185, FIG. 6, extending therefrom which controls its position. A link 187 pivotally connects arm 185 to a weight bar 188 which is pivoted at 189, FIG. 5, relative to the frame of a head, thus tending to maintain conical wheel 180 in drive-receiving contact with the lower disc 131.

Conical wheel 180 frictionally engages a conical wheel 190 which has fast thereto pulleys 192 and 194 for driving the package drive roll 85 and traverse cam 70 respectively through the V-belts 196 and 197. Rotation of drive roll 85 by engagement of the pulley 180 with lower disc 131 rotates the winding package in the winding direction. Rotation of the drive roll 85 when the pulley 180 is engaged with the upper drive disc 135 rotates the package in unwinding direction in aid of finding a broken yarn end on the package.

Figure 7:
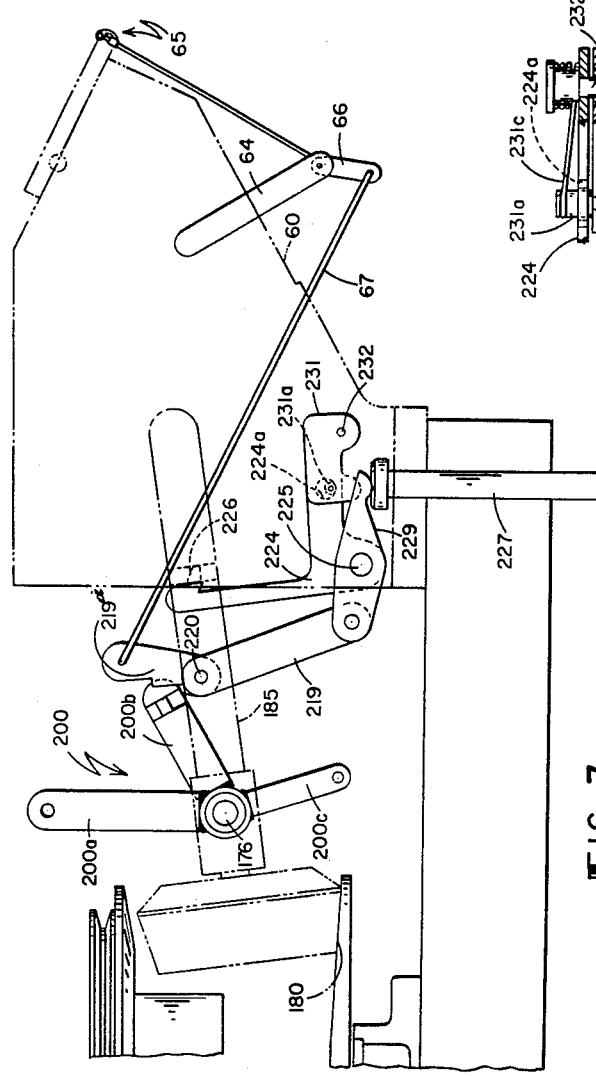
FIG. 7 is a diagram in the nature of an elevation showing certain parts of the winding unit in winding operation.

A three armed lever 200 having arms 200a, 200b and 200c, FIG. 7, is pivoted on shaft 176 and receives a rocking movement. Upper arm 200a is connected by link 201, FIG. 4, to a piece 203 which is pivoted at 204 to a disc 206 which is freely rotatable on a stub shaft 160. A cam follower roll 207 on piece 203 bears against the cam surface 161a of the combined gear, pulley and cam 161. Since this cam surface turns continually at a speed different from that of the intermittent advance of the winding unit, a rocking motion is thus imparted to the three armed lever 200 of each winding unit.

The lower arm 200c is connected by a rod 209 and spring 210 to a crank 211 which is rockable at 212 and which in turn bears upon a collar 214 fast on a rod 215 which is slidable in the winder unit frame and which extends through plate 60 and carries an arm 216. Arm 216 by its in and out motion controls a variable speed pulley for variation in the speed of the traverse cam.

The middle arm 200b serves as an element of linkage to swing the arm 185 and wheel 180 to an intermediate non-driving position upon breakage or exhaustion of the yarn. The arm 200b may be regarded as a power-actuated knock-off member. A lever 219a pivoted at 220 to arm 185 is controlled through link 67 by the yarn detector 65 and is allowed to swing from the position of FIG. 7 into the path of arm 200b when the yarn detector swings out, as in FIG. 9, whereupon arm 200b acts through lever 219a to swing arm 185 slightly clockwise around pivot 176. A latch lever 224 pivoted at 225 then moves slightly from its position of FIG. 7 to its position of FIG. 9 and in so doing drops over a projection 226 (which is on the rear side of arm 185 as seen in FIG. 7) and latches the lever in the intermediate non-driving position.

Figure 11:
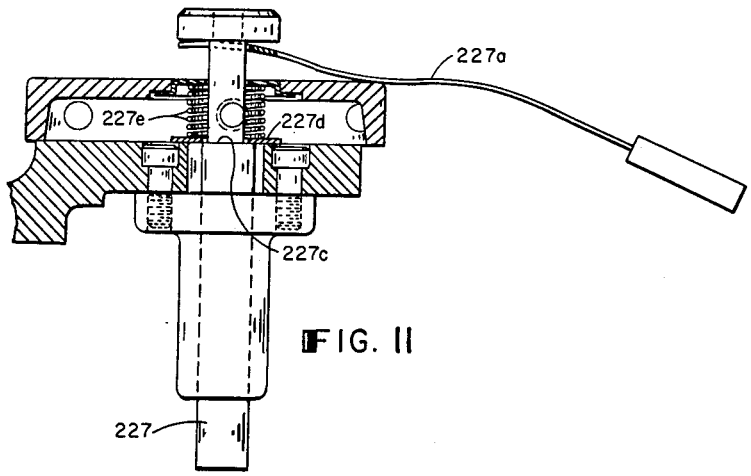
FIG. 11 is a detailed view mainly in vertical section showing the mounting of an indicating and controlling pin of a winding unit.

A pin 227 which serves both to control automatic tending mechanism and also to function in controlling the winding unit, extends down through the table and is normally held depressed by the right end or nose of a lever 229 which is pivoted at 225 and connected at its left end to the lower end of a link 219 which has the same pivot 220 on arm 185 as lever 219a. Movement of the lever 185 to the intermediate non-driving position thus raises the right end or nose of lever 229 allowing the pin 227 to rise slightly. This slight rise of pin 227 may be brought about by a lever 227a, FIG. 11, having a left end portion extending under the head of the pin and having a weight 227b at its right end, adapted to lift the pin until a shoulder 227c thereof abuts a washer 227d which is backed up by a compression spring 227e. The raised pin will indicate to the automatic tending mechanism that this unit, having the raised pin, needs to be tended.

Figure 8:
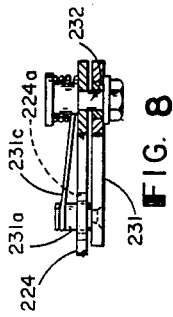
FIG. 8 is a detailed view showing the interconnection between two of the parts shown in FIG. 7.

Skipping for the moment the structure of the mechanism for detecting the condition of the winding unit according to the position of its pin 227, and assuming that the pin is in the slightly raised position which calls for tending, the tending mechanism will in this case automatically raise a pivoted plate 238, FIGS. 12 and 13, which acts upon the bottom of the pin 227 to force it upwardly still farther, this time against the resistance of spring 227e. The head of pin 227 then acts on the nose of lever 229 to cause lever 229 to pull down on link 219 thus pulling arm 185 farther clockwise around pivot 176, bringing the conical wheel 180 into contact with upper disc 135 for reverse driving of the yarn package. The head of pin 227 also acts on a lever 231 which is pivoted to latch lever 224 at 232 to throw the latch lever to unlatched position. Lever 231, FIG. 8, has a pin and a hole connection with latch lever 224 permitting limited relative movement of these parts about pivot 232, a pin 231a carried by lever 231 extending through a somewhat larger diameter hole 224a in the latch lever. A spring 231c acting on the pin 231a tends to restore lever 231 to its position relative to latch lever 224 such as shown in FIGS. 7 and 9.

Thus as pin 227 is moved up by the tending mechanism energy can be stored in the spring for swinging the latch lever 224 to unlatched position away from projection 226, FIG. 10, as soon as projection 226 has moved down far enough to disengage the beak of the latch lever.

After the end-finding operation, the tending mechanism slightly lowers the plate 238, allowing the arm 185 to resume its intermediate position in which the package is not driven, and finally lowers the plate further to allow the arm 185 to lower farther and permit winding to start.

The plate 238 which controls the position of arm 185 is normally in a lowered position so as not to act on any pin 227 which is in the lowered normal winding position. Plate 238 is operated through a yielding connection by a push rod 238a (FIGS. 12 and 13) which is raised by rotation of a cam 238b on horizontal cam shaft 285 of the tending mechanism. As will appear farther along this shaft operates only in those instances when a unit is to be tended.

While at the twelve o'clock or tending position the detector 65 is held in a raised position by a non-traveling wire so that when the unit leaves this twelve o'clock position it will be in the running condition of FIG. 7.

Since the machine employs three clutches 240, 241 and 242 of a generally similar nature it may be well to describe these clutches generally before describing other elements of the control mechanism.

Figure 14:
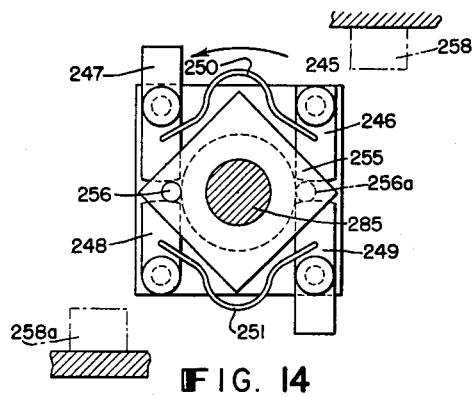
FIG. 14 is a general view explanatory of the construction and operation of clutches in the machine.
Figure 15:
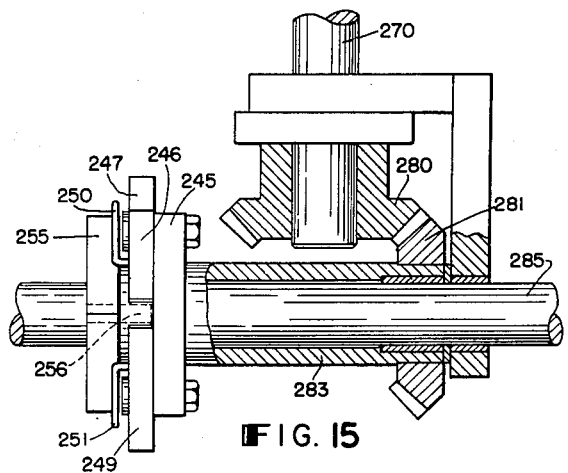
FIG. 15 shows one of the clutches, this view being taken at right angles to FIG. 14, and also shows this clutch as serving to connect a vertical drive shaft with a horizontal cam shaft in the tending mechanism.

Referring to FIG. 14 such a clutch, intended to rotate in the direction indicated, may have a pawl carrier element 245 having pivoted thereto alternate tail-less and long-tailed pawls 246, 247 and 248, 249, the long-tailed pawls having their tails in the trailing direction. The pawls are urged inwardly by spring wires 250 and 251 which interconnect pairs of pawls. The tail-less pawls are to prevent overrunning.

A pin carrier element 255, in the simplest case, carries a single pin 256 adapted to be engaged by the forward face of either long-tailed pawl, to be driven thereby. A movable stop element, represented by 258, in the path of the long tail will trip a long-tailed pawl and withdraw it from the pin and de-clutch the drive. With a single pin 256 and with a single stop element normally in the path of the long tails, the clutch will function as a one revolution clutch. Removing the stop element long enough to allow a pawl to pick up the pin will drive the pin carrier through one revolution.

The clutches referred to as 240 and 242 operate in this manner.

With a second such pin 256a added, with the stop member 258 normally removed from the pawl path, and with a second stop 258a permanently positioned to trip a pawl at approximately 180° from the position at which a pawl may be tripped by movable stop 258, such a clutch will normally drive continuously. Then if the movable stop member is operated to trip one long-tailed pawl while the other long-tailed pawl is in tripped position in passing the permanent stop 258a, the pin carrier will skip one-half revolution. The clutch referred to as 241 is operated in this manner.

Figure 20:
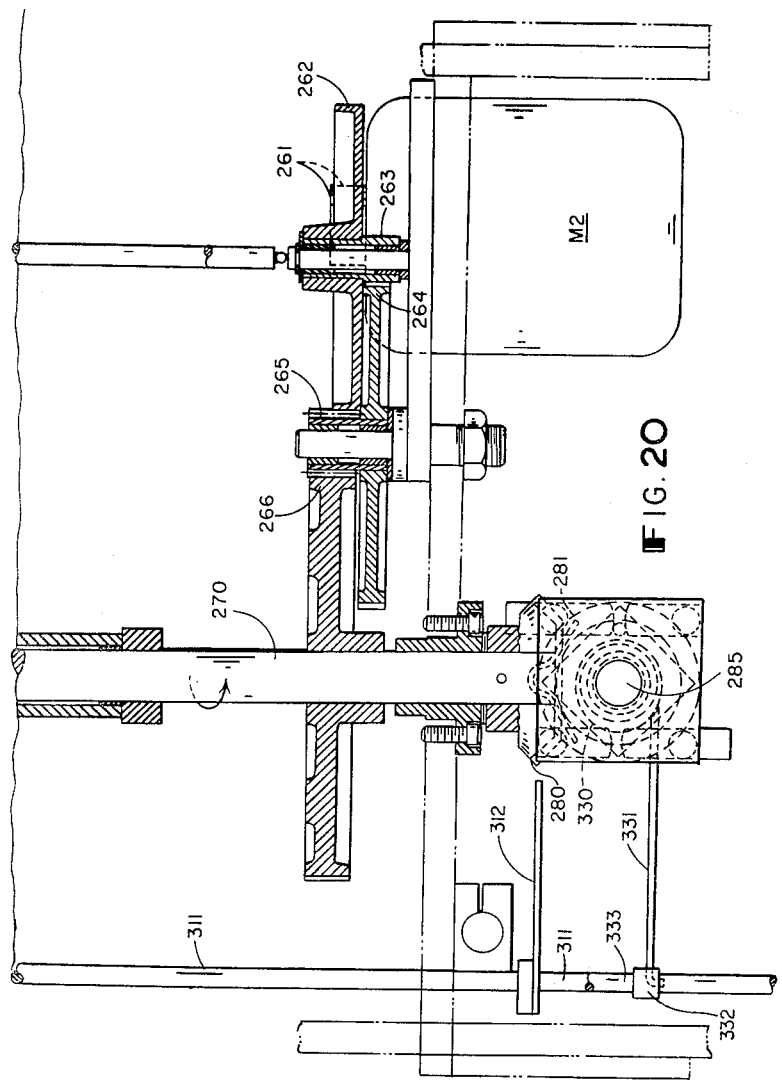

The drive to the table 52 is from a motor M-2, FIG. 20, through pulley 261, friction drive wheel 262, pinion 263, gear 264, pinion 265 and vertical shaft 270. Shaft 270 is normally coupled by clutch 241, FIG. 19, operated as described above, to a sleeve 271 which carries oppositely directed crank arm 272 carrying Geneva drive rolls 273. These rolls enter the Geneva grooves in the underside of the table 52, each roll 273 advancing the table 30° each time it engages one of the Geneva grooves.

At its bottom end the shaft 270 is connected through bevel gears 280 and 281 to a sleeve 283 carrying the pawl carrier 245 of clutch 240, the pin carrier 255 of this clutch being fast on the horizontal cam shaft 285. This shaft 285 is operated through the clutch 240 each time that a winding unit requires to be tended, regardless of whether a new bobbin requires to be supplied.

The vertical shaft 270 also carries the pawl carrier 245 of the clutch 242, the pin carrier 255 of this clutch being carried by a sleeve 287 which is rotated through clutch 242 one revolution in those instances in which the bobbin is required to be changed.

The sleeve 271 which is driven by clutch 241 carries a cam 290, FIG. 16, against the surface of which a cam-follower roll 291 is yieldingly drawn. As the cam-follower roll moves toward the center of the cam, as permitted by the cam surface, a system of linkage operates. Motion of this linkage can be blocked, short of full movement, by two possibilities, first, by the pin 227 of the winding unit which is at the eleven o'clock position being in the depressed position, the second, by yarn being encountered by yarn feeling mechanism. In the first situation, the winding unit is allowed to continue running without the tending mechanism affecting it. In the second situation, where the winding unit is not running but yarn is present, so much of the tending mechanism as is appropriate to this situation will operate, particularly clutch 240, shaft 285 and mechanism driven thereby.

In the further situation in which the linkage is not blocked but has its full motion, the additional portions of the tending mechanism concerned with changing the supply bobbin are operated, particularly the clutch 242, sleeve 287 and parts operated thereby.

Operation of the tending mechanism, either with or without supply of a new bobbin is accompanied by operation of the clutch 241 to skip one-half a revolution of the sleeve 271 and Geneva drive unit, with the result that after the winding unit has been advanced to the twelve o'clock position where the tending operations take place the table is caused to dwell considerably longer than usual. The skipping of this half revolution also suspends operation of the cam 290 and certain control functions initiated by this cam.

The cam follower 290 is carried by a bell crank 292 having a lug 293, all of which are biased in a clockwise direction, FIG. 16, by a spring 294. At 292a the bell crank is pivotally connected to links 295 and 296. Line 295 serves as a connection to clutch 240. Link 296 serves as a connection to feeler mechanism. Link 296 is pivotally connected at 297 to an arm 298 which is fast on a shaft 299. Shaft 299 carries a two armed crank 300 whose opposite ends are connected by links 301, 302 to crank arms 301a and 302a which are fast on shafts 301b, 302b. Arms 301c and 302 which are fast on these shafts carry stacks of vertically spaced feeler fingers 301d, 302d which are adapted to intermesh as indicated in FIG. 19.

When a winding unit reaches the eleven o'clock position its yarn, if present, extending from its bobbin up to its slub catcher, will lie in the region where these fingers tend to intermesh.

The rotation of cam 290 and the action of spring 294 will tend to allow the arms 301c and 302c to swing from behind the upright of the winding unit to the position of FIG. 16, and if the fingers encounter no yarn they will intermesh as shown. If the fingers do encounter yarn, the yarn blocks the fingers from intermeshing, this condition being shown in FIG. 17; and the cam follower 291 is prevented from fully following the drop in the contour of cam 290. This condition calls for retying the yarn of the winding unit.

The condition in which the fingers intermesh calls for change in the winding bobbin in addition to tying the end from the yarn package onto the new end of yarn.

However, most frequently the winding unit will be winding when it reaches the eleven o'clock position. Its pin 227 will be fully down. In this situation the lower end of the pin blocks a pin-detecting plate 298a which is fast to the arm 298, as shown in FIG. 18, and so blocks the linkage from moving the fingers 301d and 302d into detecting engagement with the yarn.

The three situations and corresponding conditions of the linkage have the following results. Link 298, as indicated, controls clutch 240. This control is through connections comprising a crank 310, shaft 311 and 312, the end of which constitutes the previously described movable stop element (represented by 258 in the description of clutches) for the clutch 240.

When a winding unit is running at the eleven o'clock position the crank 312, acting as a stop trips the clutch 240 thereby preventing drive of the horizontal cam shaft 285.

When a winding unit is not winding at the eleven o'clock position, the plate 298a not being blocked by pin 227, the crank 312 is out of range of the pawls of the clutch, allows engagement of the clutch and permits the horizontal cam shaft to be driven.

Thus the plate 290a detects whether the pin 227 of a winding unit is in its lower position indicating that the unit is winding or is in a somewhat raised position indicating that the unit is not winding. In this latter case shaft 285 is operated, operating an end-finding and tying mechanism described in a further divisional application Serial No. 210,996, filed July 19, 1962, now Patent No. 3,157,368. As a part of the end-finding operation the conical wheel 180 is raised into engagement with the upper disc 135 for reverse rotation of the yarn package, this raising of wheel 180 as well as the unlatching of lever 185 being accomplished by raising the pin 227 by the plate 238 as above described.

The skipping of the step of conveying movement by the Geneva drive device as brought about through clutch 241 is more particularly the subject of the parent application Serial No. 141,884. The holder for the conical yarn package is more particularly the subject of a further divisional application, Serial No. 210,998, filed July 19, 1962, now Patent No. 3,139,239.

I claim:

1. An automatic winding machine including a plurality of traveling winding units, a drive member common to the several units for driving them in a winding direction, and a reverse drive member past which the units travel, each unit including:
a rotatable drive-transmitting member adapted frictionally to engage said common drive member, said rotatable member being mounted for movement out of engagement with the common drive member and for movement into engagement with the reverse drive member, a yarn detector, means controlled by the yarn detector for moving the rotatable member out of engagement with the common drive member into a neutral position intermediate its position for engaging the common drive member and its position for engaging the reverse drive member, a combined indicating and linkage-operating element, linkage establishing said element in a first position when said rotatable member is in engagement with the common drive member and a second position when the rotatable member is moved to said neutral position,
the machine including:
a detector responsive to arrival thereat of a unit having its said element out of said first position and in said second position, and means controlled by the detector when said element is in said second position for moving said element to a third position in which acting through said linkage it holds said rotatable member in temporary engagement with the reverse drive member.

2. An automatic winding machine as claimed in claim 1 in which
each unit also includes:
a latch for restraining the rotatable member from return from neutral position into engagement with the common drive member, and means transmitting motion from said element to the latch as said element moves to said third position for disabling the latch.

3. An automatic winding machine including a plurality of traveling winding units, a drive member common to the several units for driving them in a winding direction, and a reverse-drive member past which the units travel,
each unit including:
a rotatable drive-transmitting member adapted frictionally to engage said common drive member, a movable mounting for the rotatable member for movement thereof out of engagement with the common drive member and for movement into engagement with the reverse-drive member, a power-actuated knock-off member, a yarn detector, means controlled by the yarn detector for transmitting motion from the knock-off member to the movable mounting whereby upon failure of the yarn the movable mounting is moved to a second position to disengage the rotatable member from the common drive member, means for latching the movable mounting in said second position to hold the rotatable member in a neutral position intermediate its position for engaging the comomn drive member and its position for engaging the reverse drive member, a movable indicating element, means yieldingly biasing said element away from a first position toward a second position, a connection between the movable mounting and the indicating element adapted to hold the indicating element in said first position when the rotatable member is in engagement with the common drive member,
said biasing means moving said element to the second position thereof when said movable mounting moves to its second position,
the machine including:
a detector responsive to arrival thereat of a unit having its said element out of said first position, and means controlled by the detector for moving said element to a third position in which acting through said connection it holds the movable mounting in position to hold the rotatable member in temporary engagement with the reverse-drive member,
each unit including:
means operable by said element upon movement thereof to said third position for disabling the latching means.

References Cited by the Examiner
UNITED STATES PATENTS

| | | | |
|---|---|---|---|
| 3,030,040 | 4/62 | Reiners | 242—35.6 |
| 3,033,478 | 5/62 | Furst | 242—35.6 |
| 3,062,462 | 11/62 | Schweiter | 242—35.5 |

MERVIN STEIN, *Primary Examiner.*